US010303297B2

(12) United States Patent
Yang et al.

(10) Patent No.: US 10,303,297 B2
(45) Date of Patent: May 28, 2019

(54) TOUCH DISPLAY PANEL AND DRIVING METHOD THEREFOR, AND DISPLAY DEVICE

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Hailin Xue, Beijing (CN); Haisheng Wang, Beijing (CN); Xiaochuan Chen, Beijing (CN); Yingming Liu, Beijing (CN); Rui Xu, Beijing (CN); Lei Wang, Beijing (CN); Wei Liu, Beijing (CN); Weijie Zhao, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 111 days.

(21) Appl. No.: 15/324,750

(22) PCT Filed: Dec. 22, 2015

(86) PCT No.: PCT/CN2015/098210
§ 371 (c)(1),
(2) Date: Jan. 9, 2017

(87) PCT Pub. No.: WO2017/024716
PCT Pub. Date: Feb. 16, 2017

(65) Prior Publication Data
US 2017/0205955 A1 Jul. 20, 2017

(30) Foreign Application Priority Data
Aug. 13, 2015 (CN) .......................... 2015 1 0498316

(51) Int. Cl.
*G06F 3/041* (2006.01)
*G06F 3/044* (2006.01)
(Continued)

(52) U.S. Cl.
CPC .......... *G06F 3/0418* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS

2014/0354590 A1  12/2014  Wang et al.
2015/0153767 A1*  6/2015  Nakayama .............. G06F 3/044
                                                                    345/174
(Continued)

FOREIGN PATENT DOCUMENTS

CN  103049157 A  4/2013
CN  103885637 A  6/2014
(Continued)

OTHER PUBLICATIONS

International Search Report and Written Opinion of International Application No. PCT/CN2015/098210, dated Apr. 27, 2016, 10 pages.
(Continued)

*Primary Examiner* — Ifedayo B Iluyomade
(74) *Attorney, Agent, or Firm* — Westman, Champlin & Koehler, P.A.

(57) ABSTRACT

The present disclosure provides a touch display panel and a driving method therefor, and a display device including the
(Continued)

touch display panel, relating to the field of display technologies, and enabling a touch function of the display panel without increasing the thickness of the display panel. The touch display panel includes an upper substrate and a lower substrate, a plurality of gate lines and a plurality of data lines provided on the lower substrate and defining a plurality of sub-pixel regions, in each of which at least one common electrode block is provided, at least one common electrode block is configured to also function as a touch driving electrode; the touch display panel further comprises a touch sensing chip and a touch sensing electrode, the touch driving electrode and the touch sensing electrode being respectively electrically connected to output ends of the touch sensing chip; the touch sensing chip is configured to, during a touch time period, apply a touch driving signal to the touch driving electrode, apply a touch sensing signal to the touch sensing electrode, and detect a change of the touch sensing signal on the touch sensing electrode so as to determine a touch position on the touch display panel.

16 Claims, 6 Drawing Sheets

(51) Int. Cl.
*G02F 1/1335* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC .. *G02F 1/133512* (2013.01); *G02F 1/134309* (2013.01); *G02F 1/136286* (2013.01); *G06F 3/041* (2013.01); *G06F 3/044* (2013.01); *G06F 3/0412* (2013.01); *G06F 3/0416* (2013.01); *G02F 2001/134345* (2013.01); *G02F 2001/134372* (2013.01); *G02F 2201/121* (2013.01); *G02F 2201/123* (2013.01); *G06F 2203/04111* (2013.01)

(56) References Cited

U.S. PATENT DOCUMENTS

| | | | |
|---|---|---|---|
| 2016/0117040 A1* | 4/2016 | Kuo | G06F 3/0416 345/174 |
| 2016/0139719 A1 | 5/2016 | Liu et al. | |
| 2016/0253022 A1 | 9/2016 | Liu et al. | |
| 2016/0283002 A1 | 9/2016 | Liu et al. | |

FOREIGN PATENT DOCUMENTS

| | | |
|---|---|---|
| CN | 104049800 A | 9/2014 |
| CN | 104375305 A | 2/2015 |
| CN | 204203592 U | 3/2015 |
| CN | 104699340 A | 6/2015 |
| CN | 105094437 A | 11/2015 |

OTHER PUBLICATIONS

English translation of Box No. V of the Written Opinion for the International Searching Authority for International Application No. PCT/CN2015/098210, 2 pages.
First Office Action from Chinese Patent Application No. 201510498316.2, dated Aug. 1, 2017, 16 pages.
Second Office Action for Chinese Patent Application No. 201510498316.2, dated Feb. 11, 2018, 18 pages.

* cited by examiner

TOUCH DISPLAY PANEL AND DRIVING METHOD THEREFOR, AND DISPLAY DEVICE

CROSS-REFERENCE TO RELATED APPLICATION

This application is a Section 371 National Stage Application of International Application No. PCT/CN2015/098210, filed on Dec. 22, 2015, entitled "TOUCH DISPLAY PANEL AND DRIVING METHOD THEREFOR, AND DISPLAY DEVICE", which has not yet published, and which claims priority to Chinese Application No. 201510498316.2, filed on Aug. 13, 2015, incorporated herein by reference in their entirety.

BACKGROUND

Technical Field

Embodiments of the present disclosure generally relate to the field of display technologies, and particularly, to a touch display panel and a driving method therefor, and a display device.

Description of the Related Art

Currently, a mainstream display panel generally implements an on-cell touch screen design to achieve a touch function, where the touch screen is attached onto a surface of a display screen such that the display panel including such touch screen and display screen has a touch function. The on-cell touch screen design, however, causes the thickness and weight of the whole structure of the display panel to be increased, which will not meet user's requirements of thin and light weight for a display panel.

SUMMARY

An object of the present disclosure is to provide a touch display panel and a driving method therefor, and a display device, for enabling a touch function of the display panel while not increasing the thickness of the display panel.

According to an aspect of the present disclosure, there is provided a touch display panel, comprising an upper substrate and a lower substrate arranged opposite to each other, the lower substrate being provided with a plurality of gate lines and a plurality of data lines, the plurality of gate lines and the plurality of data lines defining a plurality of sub-pixel regions, wherein at least one common electrode block is provided within each of the sub-pixel regions, at least one common electrode block is configured to also function as a touch driving electrode;

the touch display panel further comprises a touch sensing chip and a touch sensing electrode which is arranged to be insulated from the touch driving electrode, the touch driving electrode and the touch sensing electrode being respectively electrically connected to output ends of the touch sensing chip;

the touch sensing chip is configured to, during a touch time period, apply a touch driving signal to the touch driving electrode, apply a touch sensing signal to the touch sensing electrode, and detect a change of the touch sensing signal on the touch sensing electrode so as to determine a touch position on the touch display panel.

In the above touch display panel provided in the present disclosure, since the touch display panel comprises the touch sensing chip, the common electrode block and the touch sensing electrode, at least one common electrode block is configured to double as, or also used or function as a touch driving electrode, the touch driving electrode and the touch sensing electrode are respectively electrically connected to output ends of the touch sensing chip, and the touch sensing chip is configured to, during a touch time period, apply a touch driving signal to the touch driving electrode, apply a touch sensing signal to the touch sensing electrode, and detect a change of the touch sensing signal on the touch sensing electrode so as to determine a touch position on the touch display panel, a touch function can be achieved in the display panel without attaching any touch screen onto the surface of the display panel and without increasing the thickness of the display panel, thereby facilitating reduced thickness and weight of the display panel.

In another aspect of the present disclosure, there is provided a display device, comprising the touch display panel as described above.

Since the display device comprises the above touch display panel, the display device also has the same advantageous effects as the touch display panel, which will not be repeatedly described in the present disclosure.

In a further aspect of the present disclosure, there is provided a driving method for the above touch display panel, comprising:

dividing time for a frame into a display time period and a touch time period;

applying a common electrode signal to all common electrode blocks during the display time period; and during the touch time period, applying, by the touch sensing chip, a touch driving signal to the touch driving electrodes sequentially while applying a touch sensing signal to the touch sensing electrodes alternately, and detecting a change of the touch sensing signal on the touch sensing electrodes so as to determine the touch position.

Since the method is used for driving the above touch display panel, the method can achieve the same advantageous effects as the touch display panel, which will not be repeatedly described in the present disclosure.

BRIEF DESCRIPTION OF THE DRAWINGS

In order to clearly describe technique schemes in embodiments of the present disclosure or in prior arts, accompanying drawings used for illustrating the embodiments of the present invention will be simply described. Obviously, the accompanying drawings described below are merely some embodiments of the present disclosure, and those ordinary skilled in the art may arrive at other accompanying drawings based on these accompanying drawings without any inventive work.

LIST OF REFERENCE NUMERALS

| 1-lower substrate; | 11-gate lines; | 12-data lines; |
|---|---|---|
| 13-common electrode block; | 14-interlayer insulating layer; | 141-first through hole; |
| 141'-second through hole; | 15-thin film transistor; | 151-gate; |
| 152-active layer; | 153-source electrode; | 154-drain electrode; |
| 16-pixel electrode; | 2-upper substrate; | 21-black matrix; |
| 22-conductive layer; | 23-color filter layer; | 24-transparent protection layer; |
| 3-touch sensing chip; | 4-layer of liquid crystal molecules; | 5-driving electrode lead wire; |
| 6-conducting wire; | 7-connection structure. | |

DETAILED DESCRIPTION OF PREFERRED EMBODIMENTS

A clear and complete description of the technique schemes according to embodiments of the present disclosure will be made as below with reference to the accompanying drawings. Obviously, the embodiments described are merely parts, instead of all, of embodiments of the present disclosure. Any embodiment that is obtained based on the embodiments of the present disclosure by those skilled in the art without inventive labor will fall into protective scopes of the present invention.

Figure 1:
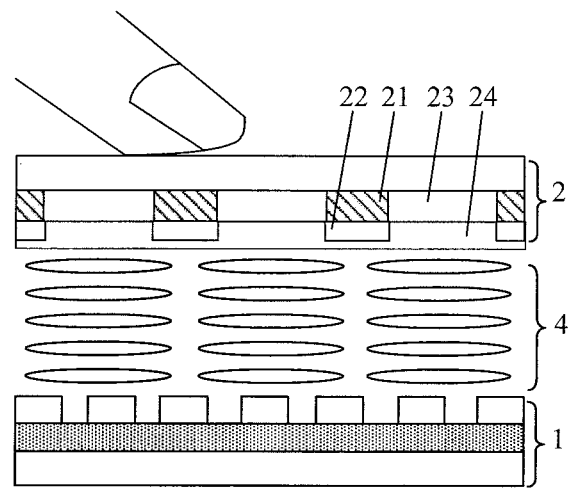
FIG. 1 is a sectional view of a touch display panel according to an exemplary embodiment of the present disclosure.
Figure 2:
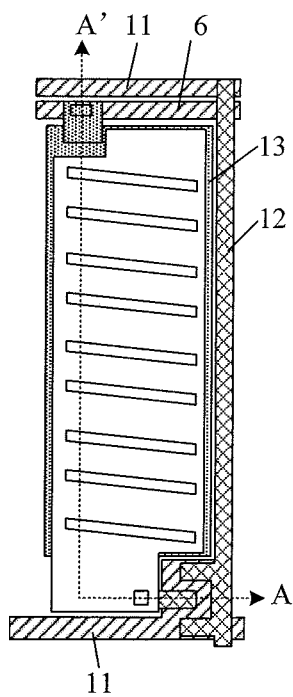
FIG. 2 is a plan view of a lower substrate of a touch display panel according to an exemplary embodiment of the present disclosure.
Figure 3:
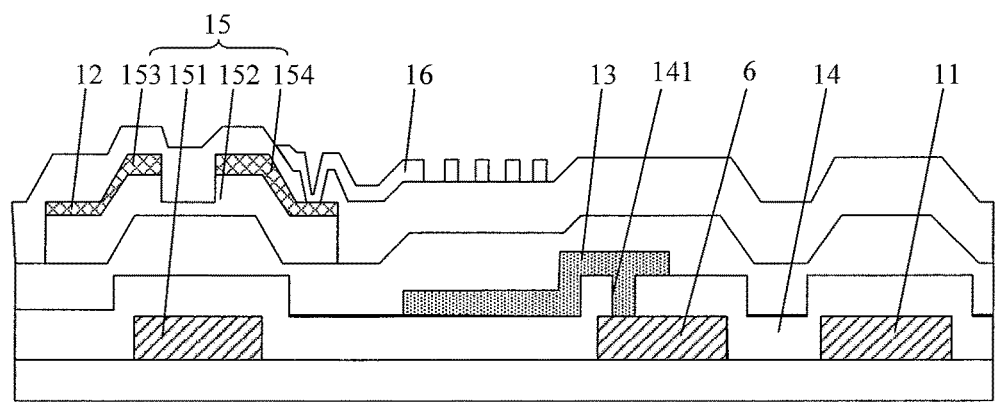
FIG. 3 is a sectional view of the lower substrate of the touch display panel according to the exemplary embodiment of the present disclosure, taken in a direction of A-A' shown in FIG. 2.
Figure 4:
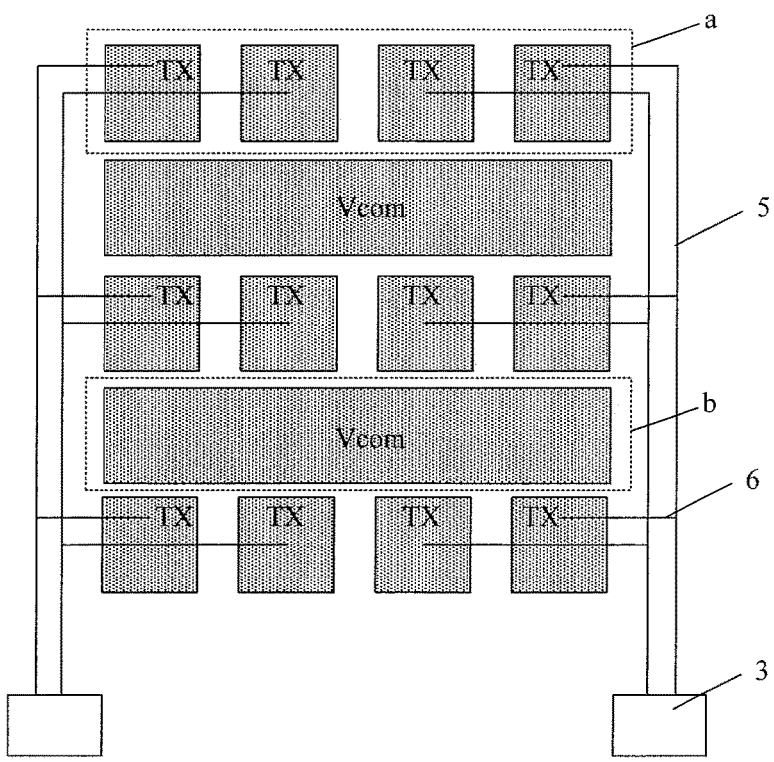
FIG. 4 is a plan view showing an arrangement of electrodes on a lower substrate of a touch display panel according to an exemplary embodiment of the present disclosure.

An exemplary embodiment of the present disclosure provides a touch display panel. As shown in FIG. 1, the touch display panel comprises a lower substrate 1 and an upper substrate 2 arranged opposite to each other. In an example, as shown in FIGS. 2 and 3, the lower substrate 1 is provided with a plurality of gate lines 11 and a plurality of data lines 12, the plurality of gate lines 11 and the plurality of data lines 12 define a plurality of sub-pixel regions, in each of which a common electrode block 13 which is used as a common electrode is provided, and at least one common electrode block 13 may double as, or configured to also used or function as, a touch driving electrode TX; in other words, the display panel comprises the touch driving electrodes TX, each of which is consisted of at least one common electrode block 13, that is, such double-used common electrode block is used as a common electrode during a display operation of the touch display panel, and used as a touch driving electrode during a touch operation of the touch display panel. As shown in FIG. 4, the touch display panel further comprises a touch sensing chip 3 and a touch sensing electrode RX (see FIG. 8) which is arranged to be insulated from the touch driving electrode TX, and the touch driving electrode TX and the touch sensing electrode RX are respectively electrically connected to output ends of the touch sensing chip 3; the touch sensing chip 3 is configured to, during a touch time period, apply a touch driving signal to the touch driving electrode TX, apply a touch sensing signal to the touch sensing electrode RX, and detect a change of the touch sensing signal on the touch sensing electrode RX so as to determine a touch position on the touch display panel. In addition, as shown in FIG. 1, the touch display panel may further comprises a layer of liquid crystal molecules 4 located between the lower substrate 1 and the upper substrate 2 arranged opposite to each other.

In an embodiment, as shown in FIG. 4, the common electrode block 13 is divided into or includes a first common electrode block and a second common electrode block; in an example, the first common electrode block doubles as or is also used as the touch driving electrode TX, the second common electrode block is not used as the touch driving electrode TX and is only used as the common electrode Vcom. In an example, an area where the first common electrode block, which is also used as the touch driving electrode TX, is located is divided into a plurality of first strip regions a extending in a row direction, an area where the second common electrode block is located is divided into a plurality of second strip regions b extending in the row direction, the first strip regions a and the second strip regions b are arranged alternately in a column direction, a plurality of the first common electrode blocks or touch driving electrodes TX are sequentially arranged within each first strip region a in the row direction, and a column of the touch driving electrodes TX are electrically connected to one of the output ends of the touch sensing chip 3 through a driving electrode lead wire 5.

Exemplarily, in an embodiment of the present disclosure, as shown in FIG. 3, a thin film transistor 15 and a pixel electrode 16 are further provided within the sub-pixel region on the lower substrate 1; in an example, the pixel electrode 16 may be, for example, a slit or strip shaped electrode, the thin film transistor 15 comprises a gate 151, an active layer 152, a source electrode 153 and a drain electrode 154. In an example, the gate 151 is electrically connected to the gate line 11, the source electrode 153 is electrically connected to the data line 12, and the drain electrode 154 is electrically connected to the pixel electrode 16. In such a case, the display mode of the above touch display panel includes AFFS (Advanced Fringing Field Switching) model; in the touch display panel implementing the AFFS display mode, a fringing electric field is generated between electrodes located within the same plane, such that liquid crystal molecules located between and above the electrodes can be deflected, thereby the brightness and contrast of the touch display panel can be significantly improved, and the touch display panel is endowed with a wider angle of view, and meanwhile, Moire phenomenon can also be avoided, enabling improvement of the display effect of the touch display panel.

In an embodiment of the present disclosure, materials of the common electrode block 13 and the pixel electrode 16 includes a transparent conductive material, for example, tin indium oxide. The gate 151 and the gate lines 11 are arranged in the same layer and are made of the same material, so that they may be formed at the same time, thereby simplifying processes of manufacturing the lower substrate 1, and reducing cost of manufacturing the lower substrate 1. Similarly, the source electrode 153 and the drain electrode 154 are arranged in the same layer as the data lines 12 and are made of the same material as the data lines 12, so that they may be formed at the same time, thereby further simplifying processes of manufacturing the lower substrate 1, and further reducing cost of manufacturing the lower substrate 1.

In order to increase resolving power or resolution of the touch display panel, sizes of respective sub-pixel region are generally designed to be smaller, and sizes of respective common electrode blocks 13 are also smaller; while, in order to provide the touch display panel with a good touch performance, sizes of the touch driving electrode TX and the touch sensing electrode RX need to be designed to be larger, such that they match with a size of a touch point touched by a finger on the touch display pane. Thus, the size of the first common electrode block does not correspond to or match with that of the touch driving electrode TX. If one first common electrode block is directly used as the touch driving electrode TX, it will result in that the touch display panel could not obtain both of a high resolving power or resolution and a good touch performance. In order to solve this problem, preferably, according to an exemplary embodiment of the present disclosure, as shown in FIG. 2, FIG. 3 and FIG. 5, a plurality of adjacent first common electrode blocks are electrically connected with each other so as to be also used as one touch driving electrode TX, thereby ensuring that the size of the touch driving electrode TX matches with a size of a touch point touched by a finger on a display device while respective first common electrode blocks may have a smaller size, so that the display device can obtain both of a higher resolving power and resolution and an improved touch performance.

Figure 5:
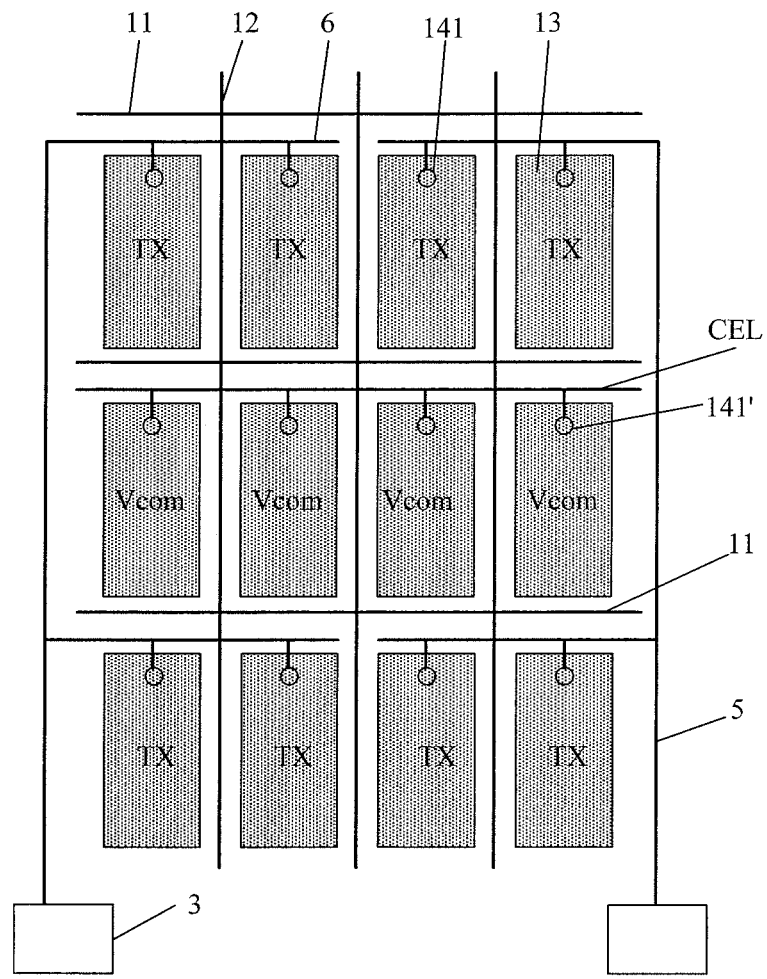
FIG. 5 is a plan view showing an arrangement of electrodes on a lower substrate of a touch display panel according to another exemplary embodiment of the present disclosure.

Exemplarily, in an embodiment of the present disclosure, a plurality of adjacent first common electrode blocks may be electrically connected with each other in the following ways: if a plurality of adjacent first common electrode blocks which are located in a same row are configured to also function as one touch driving electrode TX, the plurality of adjacent first common electrode blocks 13 which are located in a same row are electrically connected with each other through a conducting wire 6, as shown in FIG. 5; if a plurality of adjacent first common electrode blocks which are located in at least two adjacent rows are configured to also function as one touch driving electrode, a plurality of adjacent first common electrode blocks which are located in a same one of the at least two adjacent rows are electrically connected with each other through one conducting wire 6, a plurality of adjacent first common electrode blocks 13 which are respectively located in adjacent ones of the at least two adjacent rows are electrically connected with each other via a connection structure 7, the connection structure 7 may be for example located at a position on the lower substrate where the gate line 11 overlaps with the data line 12 or in a region between two adjacent rows of the first common electrode blocks of. Further preferably, the connection structure 7 is arranged in the same layer as the common electrode blocks 13 and is made of the same material as the common electrode blocks 13; in this case, the connection structure 7 and the common electrode block 13 may be formed as an integral structure and need not to be connected with each other through any through hole or the like, and, further, they may be formed simultaneously, simplifying processes of manufacturing the lower substrate 1.

Preferably, in an embodiment of the present disclosure, as shown in FIG. 3, an interlayer insulating layer 14 is provided between a layer where the common electrode block 13 is located and a layer where the gate lines 11 are located, so that there is a larger distance between the gate lines 11 and the common electrode block 13 and thereby a parasitic capacitance generated between the gate lines 11 and the common electrode block 13 is smaller. Since at least one common electrode block 13 is also used as the touch driving electrode TX or each touch driving electrode TX is consisted of at least one common electrode block 13, a parasitic capacitance generated between the touch driving electrode TX and the gate lines 11 is reduced, thereby enabling sensitivity of the touch display panel to be improved, power consumption of the touch display panel to be reduced, and touch performance of the touch display panel to be improved.

Exemplarily, in an embodiment of the present disclosure, the above conducting wire 6 is arranged in the same layer as the gate lines 11 and is made of the same material as the gate lines 11, so that they may be formed at the same time, thereby further simplifying processes of manufacturing the lower substrate 1, and further reducing cost of manufacturing the lower substrate 1.

Figure 6:
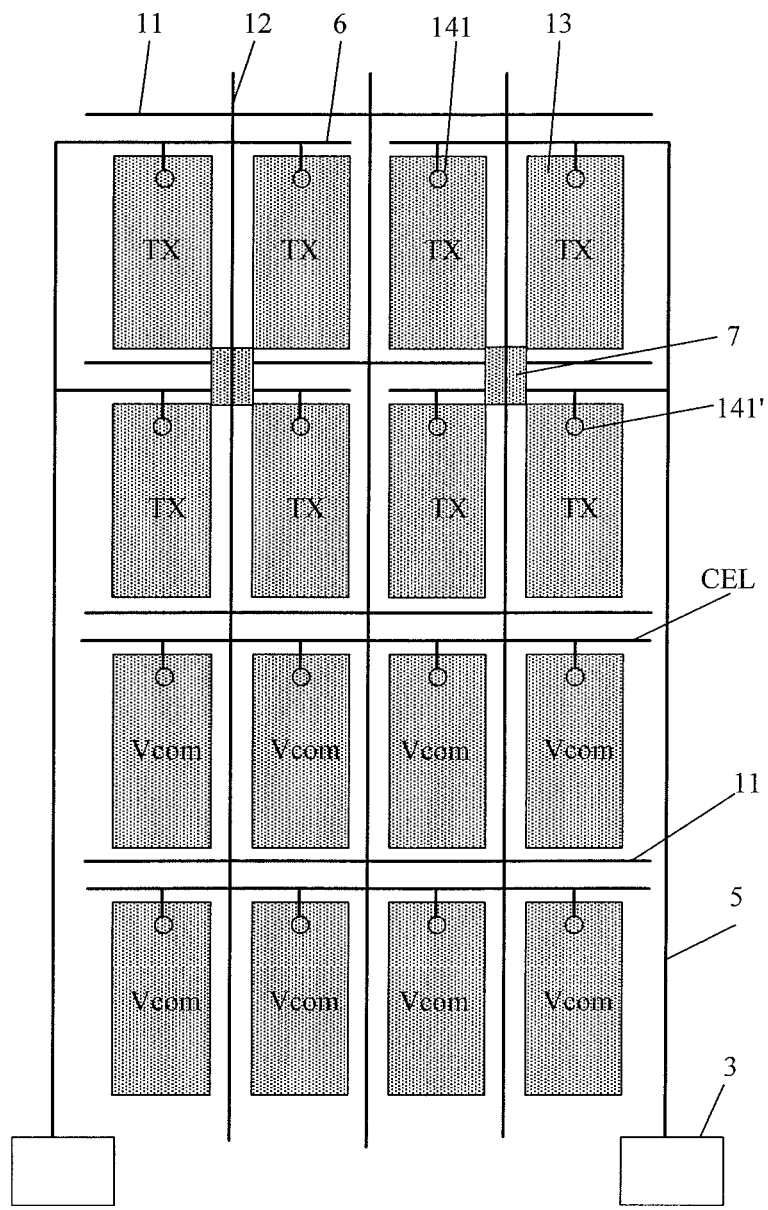
FIG. 6 is a plan view showing an arrangement of electrodes on a lower substrate of a touch display panel according to a further exemplary embodiment of the present disclosure.

Further, as shown in FIG. 5 and FIG. 6, the lower substrate 1 is further provided with a plurality of common electrode lines CEL, some of which are used as the conducting wire 6. As the common electrode lines are parallel to the gate lines 11, and a vertical projection of common electrode line on the lower substrate 1 is located between that of the gate line 11 on the lower substrate 1 and that of the common electrode block 13 on the lower substrate 1, providing the conducting wire 6 does not reduce an aperture ratio of the lower substrate 1 and thus does not degrade the display effect of the touch display panel when the conducting wire 6 is formed by the common electrode line. In this case, the touch sensing chip 3 may further have at least a part of functions of a display drive chip, for applying a common electrode signal to the first common electrode blocks through the common electrode lines, which are used as the conducting wire 6, during a display time period, thereby increasing the integration level of the touch sensing chip 3 and facilitating simplification of the structure of the touch display panel. In another example, the touch sensing chip 3 may also apply the common electrode signal to the second common electrode block through other common electrode lines, thereby further increasing the integration level of the touch sensing chip 3 and further facilitating simplification of the structure of the touch display panel.

According to an embodiment of the present disclosure, connections between the first common electrode blocks and some common electrode lines, and connections between the second common electrode blocks and some other common electrode lines are described as follows: as shown in FIG. 5 and FIG. 6, first through holes 141 are provided in portions of the interlayer insulating layer 14 corresponding to the first common electrode blocks, and some common electrode lines are connected to the first common electrode blocks through the first through holes 141. Similarly, as shown in FIG. 5 and FIG. 6, second through holes 141' are provided in portions of the interlayer insulating layer 14 corresponding to the second common electrode blocks, and some other common electrode lines are connected to the second common electrode blocks through the second through holes 141'. In an example, the other common electrode lines are common electrode lines that are not used as the conducting wire 6.

In an embodiment of the present disclosure, it is preferable that all the first through holes 141 and all the second through holes 141' have a same size, all the common electrode blocks 13 have a same size, all the first through holes 141 have a same positional relationship relative to the corresponding first common electrode blocks, all the second through holes 141' have a same positional relationship relative to the corresponding second common electrode blocks, and/or all the first through holes 141 and all the second through holes 141' have a same positional relationship relative to the corresponding common electrode blocks 13, such that all the common electrode blocks 13 present consistent electrical and/or optical characteristics, and thereby the display effect and the touch uniformity performance of the touch display panel are both improved.

In addition, it is noted that, connections between the first common electrode blocks and the some common electrode lines, and connections between the second common electrode blocks and the some other common electrode lines may be implemented in various ways, which will not be limited in embodiments of the present disclosure.

In an embodiment of the present disclosure, it is preferable that when a plurality of adjacent first common electrode blocks are connected with each other so as to be also used as one touch driving electrode, an interval between centers of two random adjacent touch driving electrodes TX and an interval between centers of two random adjacent touch sensing electrodes RX each are 10 mm, such that they match with a gap between two fingers, thereby enabling the touch display panel to have a good touch performance. A length of each touch driving electrode TX in the row direction and a length of each touch sensing electrode RX in the row direction each are in a range from 4 mm to 6 mm, and a length of each touch driving electrode TX in the column direction and a length of each touch sensing electrode RX in the column direction are both in a range from 4 mm to 6 mm, such that they match with a size of a touch point touched by the finger on the touch display panel, thereby enabling the touch display panel to have a good touch performance. A ratio of a length of each touch driving electrode TX in the row direction to a length of the touch driving electrode TX in the column direction, and/a ratio of a length of each touch sensing electrode RX in the row direction to a length of the touch driving electrode RX in the column direction are both greater than 95% and less than 105%, such that the touch display panel exhibits a consistent touch performance in the row direction and in the column direction, thereby obtaining a better uniformity of touch performance of the touch display panel. It is noted that here, sizes associated with the touch driving electrode TX and the touch sensing electrode RX are described with respect to regions where the touch driving electrode TX and the touch sensing electrode RX are located or regions defined by edges of the touch driving electrode TX and the touch sensing electrode RX. For example, the interval between centers of two random adjacent touch driving electrodes TX is an interval between centers of two adjacent regions as described above; the length of each touch driving electrode TX in the row direction is a length of the above described region in the row direction; the length of each touch driving electrode TX in the column direction is a length of the above described region in the column direction. In an example, the row direction is a direction parallel to the gate line 11, and the column direction is a direction parallel to the data line 12.

Figure 7:
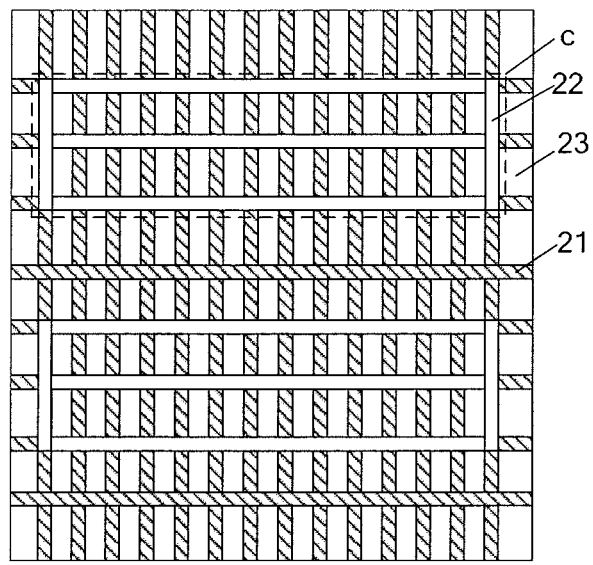
FIG. 7 is a plan view of an upper lower substrate of a touch display panel according to an exemplary embodiment of the present disclosure.

In an embodiment of the present disclosure, the upper substrate 2 has a following structure: as shown in FIG. 1 and FIG. 7, the upper substrate 2 according to the embodiment of the present disclosure is provided with a black matrix 21, and a conductive layer 22 is provided over the black matrix 21 and is divided into a plurality of conductive regions c that are separate from each other, each conductive region c being used as one touch sensing electrode RX. Further, as shown in FIG. 1 and FIG. 7, the upper substrate 2 may further comprise a color filter layer 23 located within a region surrounding by the black matrix 21 and a transparent protection layer 24 covering over the black matrix 21, the conductive layer 22 and the color filter layer 23. In an example, the color filter layer 23 comprises a red color filter layer, a green color filter layer and a blue color filter layer.

Figure 8:
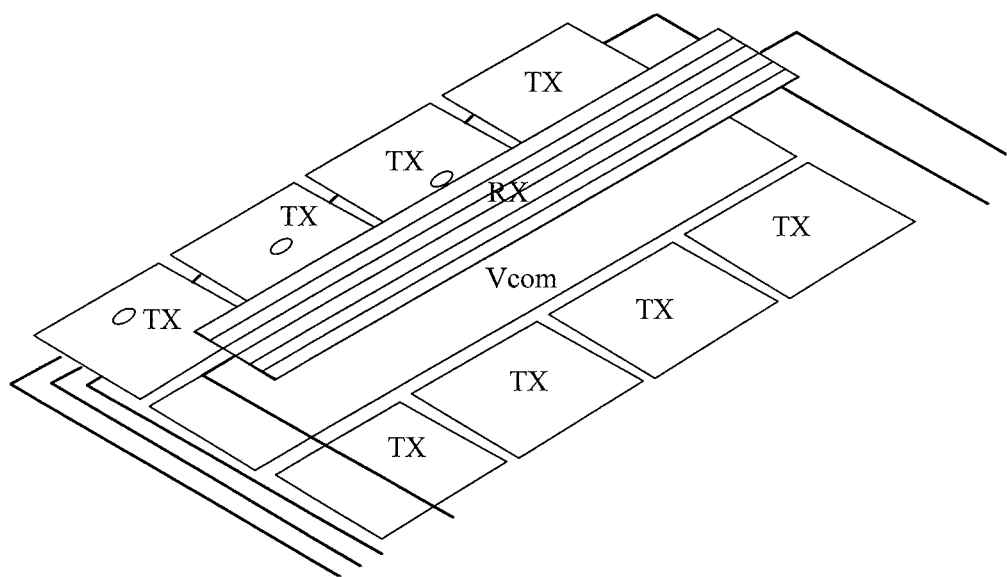
FIG. 8 is a schematic diagram showing a positional relationship between a touch driving electrode and a touch sensing electrode of a touch display panel according to an exemplary embodiment of the present disclosure.

In an embodiment of the present disclosure, it is further preferable that all conductive regions c are located at positions corresponding to the respective second common electrode blocks, that is, an orthogonal projection of each conductive region c on a plane where one substrate is located substantially overlaps with an orthogonal projection of a corresponding second common electrode block on the plane, where the second common electrode block is the common electrode block 13 which is not used as the touch driving electrode TX. In such a case, as shown in FIG. 8, there is no overlapping between the touch driving electrode TX and the touch sensing electrode RX in a direction perpendicular to the substrate and thus a small coupling capacitance therebetween, so that the touch display panel has a higher touch sensitivity and a better touch performance.

In the above touch display panel provided according to the embodiments of the present disclosure, as the touch display panel comprises the touch sensing chip, the common electrode block and the touch sensing electrode, at least one common electrode block is also used as a touch driving electrode, the touch driving electrode and the touch sensing electrode are respectively electrically connected to output ends of the touch sensing chip, and the touch sensing chip is configured to, during a touch time period, apply a touch driving signal to the touch driving electrode, apply a touch sensing signal to the touch sensing electrode and detect a change of the touch sensing signal on the touch sensing electrode so as to determine a touch position on the touch display panel, the display panel may achieve a touch function without attaching any touch screen onto the surface of the display panel to increase the thickness of the display panel, thereby facilitating reduced thickness and weight of the display panel.

Figure 9:
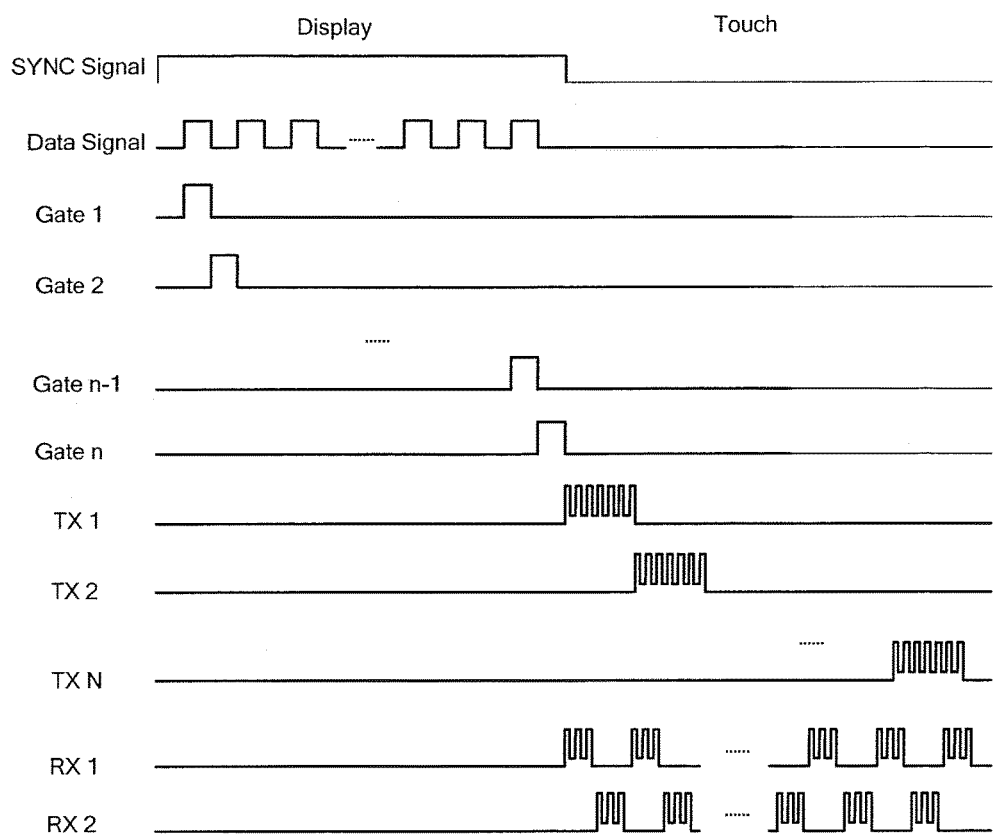
FIG. 9 is a timing diagram for a method for driving a touch display panel according to an exemplary embodiment of the present disclosure.

Further, an embodiment of the present disclosure provides a method for driving the above touch display panel. Exemplarily, as shown in FIG. 9, the method comprises: dividing time for a frame into a display time period (denoted as "Display" in FIG. 9) and a touch time period (denoted as "Touch" in FIG. 9); applying a common electrode signal, which may be exemplarily a DC signal, to all common electrode blocks during the display time period. During the display time period, a vertical scan signal (denoted as a SYNC signal in FIG. 9) is in a high level, and the first gate line (denoted as Gate 1 in FIG. 9) to the $n^{th}$ gate line (denoted as Gate n in FIG. 9) are switched on row by row and the data lines are applied with a display data signal (denoted as Date Signal in FIG. 9). During the touch time period, by the touch sensing chip, a touch driving signal is applied to the touch driving electrodes (denoted as TX1~TXN in FIG. 9) sequentially while a touch sensing signal is applied to the touch sensing electrodes (denoted as RX1~RXN in FIG. 9) alternately, and a change of the touch sensing signal on the touch sensing electrodes is detected so as to determine the touch position. Exemplarily, the touch driving signal includes a periodic pulse signal, and the touch sensing signal may also include a periodic pulse signal. Since it is used for driving the above touch display panel, the method can achieve the same advantageous effects as the touch display panel, which will not be repeatedly described in the present disclosure.

In addition, an embodiment of the present disclosure further provides a display device, comprising the touch display panel in any of the embodiments as described above. Since the display device comprises the above touch display panel, the display device also has the same advantageous effects as the touch display panel, which will not be repeatedly described in the present disclosure.

The above described contents are merely preferred embodiments of the present disclosure, and not intended to limit the present disclosure. Any modification, substitution and improvement made within the spirit and principle of the present disclosure shall be included in the protective scope of the present invention. Thus, the protective scope of the present invention should be defined by the claims.

What is claimed is:

1. A touch display panel, comprising an upper substrate and a lower substrate arranged opposite to each other, the lower substrate being provided with a plurality of gate lines and a plurality of data lines, the plurality of gate lines and the plurality of data lines defining a plurality of sub-pixel regions, wherein at least one common electrode block is provided within each of the sub-pixel regions, and at least one common electrode block is configured to also function as a touch driving electrode;
the touch display panel further comprises a touch sensing chip and a touch sensing electrode which is arranged to be insulated from the touch driving electrode, the touch driving electrode and the touch sensing electrode being respectively electrically connected to output ends of the touch sensing chip;
the touch sensing chip is configured to, during a touch time period, apply a touch driving signal to the touch driving electrode, apply a touch sensing signal to the touch sensing electrode, and detect a change of the touch sensing signal on the touch sensing electrode so as to determine a touch position on the touch display panel;
the common electrode block includes a first common electrode block that is configured to also function as the touch driving electrode and a second common electrode block that is not configured to function as the touch driving electrode;
a plurality of common electrode blocks which are located in at least two adjacent rows are configured to function as one touch driving electrode;
a plurality of adjacent common electrode blocks of the one touch driving electrode, which are located in a same one of the at least two adjacent rows are electrically connected with each other through one conducting wire;
a plurality of adjacent common electrode blocks of the one touch driving electrode, which are located in adjacent ones of the at least two adjacent rows are electrically connected with each other via a connection structure, and the touch driving electrode is electrically connected to a driving electrode lead wire through the conducting wire; and
the connection structure is located at a position on the lower substrate where the gate line overlaps with the data line.

2. The touch display panel according to claim 1, wherein an area where the first common electrode block is located is divided into a plurality of first strip regions extending in a row direction, an area where the second common electrode block is located is divided into a plurality of second strip regions extending in the row direction, a plurality of the touch driving electrodes are sequentially arranged within each of said first strip regions in the row direction, and a column of the touch driving electrodes are electrically connected to one of the output ends of the touch sensing chip through the driving electrode lead wire.

3. The touch display panel according to claim 1, wherein the connection structure is arranged in the same layer as the common electrode block and is made of the same material as the common electrode block.

4. The touch display panel according to claim 1, wherein an interlayer insulating layer is provided between a layer where the common electrode block is located and a layer where the gate lines are located.

5. The touch display panel according to claim 4, wherein the conducting wire is arranged in the same layer as the gate lines and is made of the same material as the gate lines.

6. The touch display panel according to claim 5, wherein the lower substrate is further provided with a plurality of common electrode lines, which are arranged in the same layer as the gate lines and are made of the same material as the gate lines,
wherein some ones of the common electrode lines are configured as the conducting wires, and other ones of the common electrode lines are electrically connected with the second common electrode blocks, and
wherein the touch sensing chip is further configured to apply a common electrode signal to the first common electrode blocks through the conducting wire during a display time period.

7. The touch display panel according to claim 6, wherein first through holes are provided in a portion of the interlayer insulating layer corresponding to the first common electrode blocks, and the common electrode lines configured as the conducting wire are electrically connected with the first common electrode blocks via the first through holes.

8. The touch display panel according to claim 7, wherein second through holes are further provided in a portion of the interlayer insulating layer corresponding to the second common electrode blocks, and the other common electrode lines are electrically connected with the second common electrode blocks via the second through holes.

9. The touch display panel according to claim 8, wherein all the first through holes and all second through holes have a same size,
all the first through holes have a same positional relationship relative to corresponding first common electrode blocks,
all the second through holes have a same positional relationship relative to corresponding second common electrode blocks, and/or
all the first through holes and all the second through holes have a same positional relationship relative to corresponding common electrode blocks.

10. The touch display panel according to claim 1, wherein an interval between centers of any two adjacent touch driving electrodes is 10 mm, and/or an interval between centers of any two adjacent touch sensing electrodes is 10 mm.

11. The touch display panel according to claim 1, wherein
a length of each touch driving electrode in the row direction is in a range from 4 mm to 6 mm and/or a length of each touch sensing electrode in the row direction is in a range from 4 mm to 6 mm, and/or
a length of each touch driving electrode in the column direction is in a range from 4 mm to 6 mm and/or a length of each touch sensing electrode in the column direction is in a range from 4 mm to 6 mm.

12. The touch display panel according to claim 1, wherein a ratio of a length of each touch driving electrode in the row direction to a length of said touch driving electrode in the column direction is greater than 95% and less than 105%, and/or a ratio of a length of each touch sensing electrode in the row direction to a length of said touch driving electrode in the column direction is greater than 95% and less than 105%.

13. The touch display panel according to claim 1, further comprising a thin film transistor and a pixel electrode provided within the sub-pixel region on the lower substrate, the thin film transistor comprising a gate, an active layer, a source electrode and a drain electrode;
wherein the gate is electrically connected to the gate line, the source electrode is electrically connected to the data line, and the drain electrode is electrically connected to the pixel electrode.

14. The touch display panel according to claim 1, wherein the upper substrate is provided with a black matrix, and a conductive layer is provided over the black matrix and is divided into a plurality of conductive regions that are separate from each other, each conductive region being used as one touch sensing electrode.

15. The touch display panel according to claim 14, wherein each conductive region is located at such a position that it overlaps with at least one common electrode block, which is not configured as the touch driving electrode, in a direction perpendicular to a surface of the substrate.

16. A display device, comprising the touch display panel according to claim 1.

* * * * *